United States Patent Office 3,080,421
Patented Mar. 5, 1963

3,080,421
PURIFICATION OF TEREPHTHALIC ACID
Eugene L. Ringwald, Decatur, Ala., assignor, by mesne assignments, to Monsanto Chemical Company, a corporation of Delaware
No Drawing. Filed Nov. 18, 1958, Ser. No. 774,610
6 Claims. (Cl. 260—524)

This invention relates to a method of preparing pure terephthalic acid from impure mixtures as obtained by the oxidation of para-dialkylbenzenes. More particularly, the invention relates to a method of separating pure terephthalic acid from impure mixtures as obtained by the oxidation of para-xylene with air.

It is known that para-xylene and similar dialkylbenzenes wherein the alkyl groups may be higher than methyl, for example, ethyl, propyl, butyl, and higher can be converted to terephthalic acid by a process commonly named the liquid-phase air oxidation process. Such process involves the halogen activation of a metal that catalyzes the air oxidation of the alkyl groups on the benzene ring; the process is attractive because of its flexibility and lowness of cost. The terephthalic acid prepared in this manner heretofore could not be sufficiently purified in an economical manner to meet the requirements for use as an intermediate for producing synthetic fibers.

Terephthalic acid is used today in large quantities as an intermediate in the preparation of synthetic linear polyethylene terephthalate having film- and fiber-forming properites. Contrary to what may seem to be the most attractive method for producing polyethylene terephthalate, viz., simply reacting terephthalic acid with ethylene glycol, the process for virtually all commercial production of such polymer involves first forming the dimethyl ester derivative of terephthalic acid and carrying out an ester-interchange reaction between this derivative and ethylene glycol to form bis($\beta$-hydroxyethyl) terephthalate monomers or lowly polymerized polymers thereof which are polymerized to polyethylene terephthalate of suitable molecular weight. This commercial process is used because of the lack of rapidity of reaction between terephthalic acid and ethylene glycol as compared with the reaction between dimethyl terephthalate and ethylene glycol. A concomitant reason for the employment of dimethyl terephthalate is that dimethyl terephthalate can be conveniently subjected to conventional purification techniques whereas terephthalic acid can not.

However, recently a method of directly reacting terephthalic acid of high purity and ethylene glycol under controlled conditions to produce polyethylene terephthalate having excellent film- and fiber-forming properties at a rapid rate was learned. Such method is described in copending application Serial No. 744,608, now abandoned filed simultaneously herewith.

It was found that commercially obtained terephthalic acid manufactured by the above-discussed liquid-phase air oxidation process and purified by known methods unfortunately does not possess the necessary degree of purity for use in the process of the aforesaid copending application. When the commercial acid was reacted with ethylene glycol in accordance with the copending application, the polyethylene terephthalate obtained was extremely poor in color (black) and had a substantially reduced melting point with the degree of crystallinity of the polymer being unsatisfactorily low as compared with the crystallinity of polyethylene terephthalate produced via the ordinary ester-interchange method. The reduced melting point and reduced crystallinity are attributed to the formation of polyglycol ether esters therein, which, even in small amounts, adversely affect these important properties. While it is not entirely clear why such formation occurs, one explanation is that the presence of certain acidic or acid-forming impurities indigenous in the liquid-phase air oxidation process or similar impurities extraneously introduced by purification techniques catalyzes the production of the polyglycol ether esters.

Moreover, the impurties in the terephthalic acid which are indigenous to the method of preparation are not readily removed by adsorption on charcoal. Some of these indigenous impurities are highly colored and others are not as they exist in the commercial terephthalic acid. Those that are colored transfer their color to the polymer made therefrom and the colorless ones are heat-unstable so that they undesirably impart color to the polymer.

Thus, a treatment was needed which would degrade or transform the indigenous impurities so that they could be adsorbed on charcoal. This change or degradation of impurities can be visually observed by the darkening of the sulfuric acid solution of the commercial acid. Absolutely pure terephthalic acid is not degraded by sulfuric acid even at a temperature as high as 230° C. Indeed, a 10 percent solution of pure terephthalic acid in concentrated sulfuric acid at 230° C. will remain substantially colorless for hours.

Therefore, it is a general object of the present invention to provide a method for preparing pure terephthalic acid obtained by the oxidation of para-dialkylbenzenes. It is a further object of the present invention to provide a method of purifying terephthalic acid obtained by the liquid-phase air oxidation of para-xylene. It is another object of the present invention to provide a method of purifying terephthalic acid obtained by the liquid-phase air oxidation process of para-xylene in such a manner that the acid may be used to react directly with ethylene glycol in the production of linear polyesters. Other objects and advantages of the present invention will be apparent from the detailed description herein.

In accordance with the present invention, it has been found that terephthalic acid can be effectively and efficiently purified by intimately mixing the acid with sulfuric acid at an elevated temperature. The quantity of sulfuric acid used and the temperature employed are correlated so that the desired amount of terephthalic acid dissolves therein. Then, the solution containing the dissolved terephthalic acid is slowly cooled until approximately 80 percent of the original charge of crude terephthalic acid is precipitated. The precipitated terephthalic acid is then separated from the acid solution by filtration or by similar conventional techniques used for separating solids from liquids. The filtrate which is essentially sulfuric acid containing the unprecipitated terephthalic acid may be reused for treating additional amounts of commercial terephthalic acid for economical reasons. The precipitated terephthalic acid is brought into intimate contact with an aqueous solution of ammonium hydroxide to dissolve the terephthalic acid therein in the form of its ammonium salt. The resulting aqueous solution containing the ammonium salt is contacted for an appropriate period with activated carbon. Following this step, the ammonium solution is added to a solution of an acid having an ionization constant greater than that of terephthalic acid to regenerate and reprecipitate the acid. The reprecipitated acid is then separated after which it is thoroughly washed and dried. The thus-purified terephthalic acid is particularly suitable for preparing polyethylene terephthalate with ethylene glycol and is substantially free of ionizable acidic and acid-forming impurities that may otherwise catalyze the formation of polyglycol ether esters when it is reacted with ethylene glycol.

It is quite unexpected that the terephthalic acid treated according to this invention could be used to make a satisfactory polyethylene terephthalate by a direct reaction between the acid and ethylene glycol in view of the fact that when the acid is regenerated under commonly used conditions of adding a precipitating acid to the aqueous solution of the ammonium terephthalate, the required degree of purity can not be obtained conveniently. Therefore, it is seen that it is highly important to the proper practice of this invention that in the regeneration step the solution containing the ammonium salt be added to an acid rather than the precipitating acid be added to the ammonium salt solution, otherwise the improved result in regard to the producing of polyethylene terephthalate is not attained.

Based on the foregoing discovery, it is thought that when the acid is regenerated by adding the precipitating acid to the solution containing the ammonium terephthalate, the ionizable acidic and acid-forming impurities became occluded in the terephthalic acid to such an extent that they can not be subsequently removed effectively therefrom.

As indicated above, the process of the present invention is particularly adapted for purifying terephthalic acid that has been produced according to the liquid-phase air oxidation process.

In the practice of the present invention, the crude terephthalic acid is dissolved in sulfuric acid, the amount of acid employed preferably being just sufficient to dissolve entirely the terephthalic acid. According to the preferred embodiment of the present invention the crude terephthalic acid is dissolved in concentrated sulfuric acid by adding the terephthalic acid to a sufficient quantity of sulfuric acid with stirring and by heating the resulting slurry to a temperature in the range of 150–300° C., with the temperature range preferably being 220–250° C. It will be appreciated that in the optimum practice of the present invention the temperature and the concentrations of the acids are selected to give the most efficient dissolution of the terephthalic acid.

Next, the sulfuric acid solution containing the terephthalic acid dissolved therein is slowly cooled until approximately 80 percent or more of the original charge of the crude terephthalic acid is precipitated. The precipitated terephthalic acid is conveniently separated by conventional methods and may be carried out at any temperature at or below the temperature required to precipitate the terephthalic acid. The separation of the precipitated terephthalic acid from the liquid phase may involve the use of filtration devices or a centrifuge. The terephthalic acid separated from the liquid contains residual sulfuric acid which should be removed therefrom by repeated washings of the precipitate with a non-solvent for the terephthalic acid, such as water. This precipitated terephthalic acid is dissolved in an aqueous solution of ammonium hydroxide, the amount of hydroxide being substantially stoichiometrically equivalent or preferably more to the amount of terephthalic acid to be dissolved. Again, it will be appreciated that the time required in this dissolving step is dependent on obvious process variables such as temperature, concentrations of the terephthalic acid and ammonium hydroxide, and the like.

After the terephthalic acid is dissolved in the ammonium hydroxide solution, it may be desirable to filter the resulting solution in order to separate any insoluble bodies therefrom, although this operation may not always be necessary. This solution containing the ammonium salt of terephthalic acid is ordinarily a dark brown color and is treated with a high grade activated carbon that adsorbs the colored bodies and other impurities from the solution. The treatment operation may be accomplished in a variety of ways. For example, the solution may be permitted to flow in a continuous fashion by gravity or forced through a column or like device containing the activated carbon. The contact between the solution and the carbon is maintained until at least the discoloration of the solution that is ordinarily present is substantially eliminated. Alternatively, activated carbon, preferably in powdered form, may be added to the solution and with the mixture being stirred for a sufficient time. Again, the time necessary to accomplish this depends on many obvious process conditions, namely the temperature, the specific type of carbon, etc.

The solution which has had the colored bodies removed therefrom and containing the ammonium terephthalate is separated from the activated carbon by conventional processes, for example, by filtration, centrifugation, and the like.

The terephthalic acid is regenerated from the solution with an acid that is a stronger acid than terephthalic acid. As pointed out above, this is accomplished at a practical temperature by adding the purified ammonium terephthalate solution to an acid rather than by adding an acid to the solution. It will be appreciated that the amount of acid required is preferably at least a stoichiometric quantity. In addition to the acids used below in the examples, any acid that has an ionization constant greater than that of terephthalic acid may be suitable. Thereafter, the terephthalic acid is separated at a convenient temperature by filtration or like conventional operations and washed thoroughly with water, preferably hot water above 60° C. and, perhaps exceeding the boiling point of the water when superatmospheric pressures are employed. The thus-treated terephthalic acid is dried, for example by placing same in a heated oven or by the use of other conventional drying techniques.

Further details of the practice of the invention are set forth in the following examples that show the contrasting results obtained when terephthalic acid prepared by the air oxidation process is purified in and not in accordance with the present invention. All percentages are percentages by weight unless otherwise designated.

*Example 1*

One hundred grams of commercially produced terephthalic acid (prepared by the aforesaid air oxidation process) was dissolved in 900 grams of concentrated sulfuric acid at a temperature of 230° C. with stirring. Upon cooling to room temperature, the terephthalic acid precipitated from the sulfuric acid solution. The terephthalic acid was separated by filtration through a glass Büchner-type funnel. The filter cake was washed several times with hot water until the filtrate showed substantially no sulfuric acid. The terephthalic acid which weighed 81 grams on a dry basis was then dissolved in a solution containing 750 mls. of water and 160 grams of 28 percent ammonium hydroxide, the ammonium hydroxide being in excess of that required to effect solution of the terephthalic acid. After the terephthalic acid was dissolved in the form of ammonium terephthalate, the solution was filtered and then slowly passed through a column containing activated carbon over a period of time sufficient to produce a substantially colorless solution. The carbon was purchased under the name of Pittsburg Carbon (type OL). An aqueous solution containing 6 percent sulfuric acid in an amount of 3600 grams was added to the decolorized solution of ammonium terephthalate to form a precipitate composed of terephthalic acid. Then the precipitated acid was separated by filtration through a Büchner-type funnel and was thoroughly washed with water at a temperature of almost 100° C. and air dried in a circulating oven.

A slurry consisting of 66.4 grams of this purified terephthalic acid and 248 grams of ethylene glycol was heated in a stainless steel autoclave at a temperature of 221 to 231° C. and under a gauge pressure of 25 to 27 pounds per square inch for 20 minutes in an atmosphere of nitrogen gas. During the reaction induced between the acid and glycol, 38 mls. of distillate was collected. The resulting reaction mixture was transferred to a glass polymerization vessel with 60 mgs. of zinc acetylacetonate being added as a polymerization catalyst. While the mixture was being stirred at 285° C., excess glycol was distilled off. Thereafter, the reaction mixture was subjected to a reduced pressure of less than 0.3 mm. of mercury at the same temperature for 70 minutes. The polymerizing mixture rapidly darkened in color and then became black. The resulting polymer was a glass-like substance melting below 200° C. and was unsuitable for the formation of strong fibers. This example shows that when terephthalic acid is regenerated from the ammonium terephthalate not in accordance with one phase of the present invention, it reacts with ethylene glycol under the specified conditions to produce a resulting polymer having a poor color and low melting point.

*Example II*

The procedure of Example I was duplicated except that the terephthalic acid was regenerated from the ammonium salt solution by adding the ammonium salt solution to the 6 percent sulfuric acid solution. The ultimate polymer prepared from this terephthalic acid and ethylene glycol in accordance with the polymerization method outlined in Example I was white in color and melted at 257–258° C. Fiber-forming properties of the polymer were excellent.

*Example III*

The procedure of Example II was repeated except that the terephthalic acid was regenerated from the ammonium salt solution by the addition of the salt to a solution containing slightly more than the stoichiometric amount of acid prepared by diluting 530 mls. of concentrated hydrochloric acid to 1500 mls. with distilled water. The ultimate polymer prepared from this terephthalic acid and ethylene glycol in accordance with the polymerization method outlined in Example I was white in color and melted at 257–258° C. Fiber-forming properties of the polymer were excellent. However, when this experiment was repeated by adding the hydrochloric acid to the ammonium salt solution and the terephthalic acid regenerated in this manner was reacted with ethylene glycol in accordance with the polymerization method outlined in Example I, the polymer was poor in color. Fiber-forming properties of the polymer were also poor.

*Example IV*

The procedure of Example II was again duplicated except that the terephthalic acid was regenerated from the ammonium salt solution by adding the solution slowly with stirring to a solution containing acetic acid in excess of the amount necessary to convert the ammonium terephthalate to terephthalic acid. After the terephthalic acid was filtered, washed, and dried as above, a slurry was prepared from 158.4 grams of this purified terephthalic acid and 530 mls. of ethylene glycol. Following this step, the slurry was heated under nitrogen in a polymerization vessel at 240–246° C. and at 28–47 p.s.i.g. pressure for 20 minutes. During this time a total of 80 mls. of aqueous distillate was collected. As a polymerization catalyst, 90 mgs. of zinc acetylacetonate was then added to the reactor. The excess glycol was distilled off and the resulting mixture was heated while being stirred at a temperature of 285° C. and to a pressure of less than 0.3 mm. of mercury for 70 minutes to complete the condensation reaction between the terephthalic acid and the ethylene glycol. Upon being cooled the polymer melt rapidly set to a white opaque solid. A sample of the polymer melted at 255–256° C.

*Example V*

The procedure of Example IV was repeated except that the terephthalic acid was regenerated by the addition of the ammonium salt solution to a solution containing an amount of sulfurous acid necessary to regenerate the terephthalic acid. The ultimate polymer prepared from this terephthalic acid and ethylene glycol in accordance with the polymerization method outlined in Example I was white in color and melted at 250° C. Fiber-forming properties of the polymer were excellent.

*Example VI*

To demonstrate the necessity of treating the crude terephthalic acid with sulfuric acid, a solution was prepared by mixing and by stirring the following: 1206 grams of commercially produced terephthalic acid (prepared by the aforesaid air oxidation process), 970 grams of 28 percent ammonium hydroxide, and 13 liters of water. After the terephthalic acid was dissolved in the form of ammonium terephthalate, the solution was filtered and contacted with activated carbon as above in Example I. The ammonium salt solution was added slowly with stirring to 7850 grams of aqueous 10 percent sulfuric acid solution to precipitate terephthalic acid. The precipitated acid was filtered, washed thoroughly with hot water at a temperature near the boiling point of water, and air dried in a circulating oven.

A slurry which consisted of 100 grams of the thus-purified terephthalic acid and 200 mls. of ethylene glycol was added to a polymerization vessel in which a temperature of 235° C. and a pressure of 25–60 p.s.i.g. was maintained for 30 minutes in an atmosphere of nitrogen gas. A total of 98 mls. of distillate composed primarily of water was collected during this reaction. Next, the reaction mixture was transferred to a glass polymerization vessel with 60 mgs. of zinc acetylacetonate being added as a catalyst. While the mixture was being stirred at 285° C., excess glycol distilled off. Thereafter, the reaction mixture was subjected to a reduced pressure of less than 0.3 mm. of mercury at the same temperature for 70 minutes. The resulting polymer after cooling was extremely dark in color and melted at about 237–245° C. Fiber-forming properties of the brittle polymer were also poor.

The present invention affords a convenient and expedient method of substantially complete purification of commercial terephthalic acid obtained by the air oxidation of para-dialkylbenzenes. Terephthalic acid treated in accordance with the present invention is eminently suitable for preparing polyethylene terephthalate by condensing the acid directly with ethylene glycol under controlled conditions. The polyethylene terephthalate may be formed into fibers, filaments, films, and like shaped objects that have desirable properties. Numerous other advantages will be apparent to those skilled in the art.

While the present invention has been described with respect to certain of its specific embodiments, it is to be understood that this is merely intended in an illustrative sense and that changes and variations may be made without departing from the spirit and scope of the invention as defined in the appended claims.

What is claimed is:

1. A process for removing color-forming contaminants from crude terephthalic acid as it is obtained from the air oxidation process wherein para-xylene is oxidized in the liquid phase and wherein said oxidation process is catalyzed by the halogen activation of a metal which comprises the steps of intimately contacting the crude terephthalic acid with concentrated sulfuric acid at a temperature in the range of 150–300° C. to form a solution thereof, cooling sulfuric acid solution of terephthalic acid until approximately 80 percent of the terephthalic acid therein is precipitated, separating the precipitated terephthalic acid from the sulfuric acid solution, forming and dissolving ammonium terephthalate by intimately mixing the precipitated terephthalic acid with an aqueous solution of ammonium hydroxide, contacting the resulting ammonium hydroxide solution with activated carbon for a sufficient time such that the ammonium hydroxide solution containing the ammonium terephthalate is substantially decolorized, separating said ammonium hydroxide solution from said activated carbon, forming and reprecipitating the terephthalic acid by slowly adding the ammonium hydroxide solution to a second acid having an ionization constant greater than that of terephthalic acid, said second acid being present at least in an amount necessary to convert the ammonium terephthalate in the resulting solution to terephthalic acid, separating the reprecipitated terephthalic acid therefrom, and then washing the thus-separated terephthalic acid with hot water.

2. The process of claim 1 wherein the second acid is hydrochloric acid.

3. The process of claim 1 wherein the second acid is sulfuric acid.

4. The process of claim 1 wherein the second acid is acetic acid.

5. The process of claim 1 wherein the second acid is sulfurous acid.

6. A process for removing color-forming contaminants from crude terephthalic acid as it is obtained from the air oxidation process wherein para-xylene is oxidized in the liquid phase and wherein said oxidation process is catalyzed by the halogen activation of a metal which comprises the steps of intimately contacting the crude terephthalic acid with concentrated sulfuric acid at a temperature in the range of 150–300° C. to form a solution thereof, cooling the sulfuric acid solution of terephthalic acid until approximately 80 percent of the terephthalic acid therein is precipitated, separating the precipitated terephthalic acid from the sulfuric acid solution, washing the precipitated terephthalic acid with hot water until the terephthalic acid is substantially free of sulfuric acid, forming and dissolving ammonium terephthalate by intimately mixing the precipitated terephthalic acid with an aqueous solution of ammonium hydroxide, contacting the resulting ammonium hydroxide solution with activated carbon for a sufficient time such that the ammonium hydroxide solution containing the ammonium terephthalate is substantially decolorized, separating said ammonium hydroxide solution from said activated carbon, forming and reprecipitating the terephthalic acid by slowly adding the ammonium hydroxide solution to a second acid having an ionization constant greater than that of terephthalic acid, said second acid being present at least in an amount necessary to convert the ammonium terephthalate in the resulting solution to terephthalic acid, separating the reprecipitated terephthalic acid therefrom, then washing the thus-separated terephthalic acid with hot water, and thereafter drying the washed terephthalic acid.

References Cited in the file of this patent

UNITED STATES PATENTS

| | | |
|---|---|---|
| 2,684,382 | Toland | July 20, 1954 |
| 2,697,723 | Carlston et al. | Dec. 21, 1954 |
| 2,734,079 | Aroyan et al. | Feb. 7, 1956 |

FOREIGN PATENTS

| | | |
|---|---|---|
| 788,276 | Great Britain | Dec. 23, 1957 |